(12) United States Patent
Yamauchi et al.

(10) Patent No.: US 10,811,813 B2
(45) Date of Patent: Oct. 20, 2020

(54) TEMPORARY LOCKING STRUCTURE FOR END PORTION OF WIRE HARNESS

(71) Applicant: YAZAKI CORPORATION, Tokyo (JP)

(72) Inventors: Akinori Yamauchi, Toyota (JP); Mikiya Matsuoka, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/599,100

(22) Filed: Oct. 10, 2019

(65) Prior Publication Data
US 2020/0153156 A1   May 14, 2020

(30) Foreign Application Priority Data
Nov. 13, 2018  (JP) .................. 2018-212684

(51) Int. Cl.
*H01R 13/52* (2006.01)
*B60R 16/02* (2006.01)
*H01R 13/621* (2006.01)
*B60K 1/04* (2019.01)

(52) U.S. Cl.
CPC ..... *H01R 13/5213* (2013.01); *B60R 16/0207* (2013.01); *H01R 13/621* (2013.01); *B60K 1/04* (2013.01); *B60K 2001/0416* (2013.01); *B60Y 2200/91* (2013.01)

(58) Field of Classification Search
CPC .................................................. H01R 4/4818
USPC .................... 439/842; 174/135, 75 A, 138 F
See application file for complete search history.

(56) References Cited

U.S. PATENT DOCUMENTS

| 3,176,257 | A | * | 3/1965 | Introvigne | ............. | H01R 13/60 |
| | | | | | | 439/528 |
| 5,130,890 | A | * | 7/1992 | Nhu | ........................ | H01R 13/60 |
| | | | | | | 312/282 |
| 5,442,138 | A | * | 8/1995 | Ochi | ........................ | H01R 4/70 |
| | | | | | | 174/135 |
| 5,923,094 | A | * | 7/1999 | Seeberger | ............... | H02K 11/38 |
| | | | | | | 307/9.1 |
| 6,600,109 | B1 | * | 7/2003 | Andre | ..................... | B65H 75/36 |
| | | | | | | 174/135 |
| 7,338,314 | B2 | * | 3/2008 | Thai | ........................ | H01R 43/26 |
| | | | | | | 248/51 |
| 2013/0248246 | A1 | | 9/2013 | Oga | | |

FOREIGN PATENT DOCUMENTS

JP    2012-125097 A    6/2012

* cited by examiner

*Primary Examiner* — Phuong K Dinh
(74) *Attorney, Agent, or Firm* — Kenealy Vaidya LLP

(57) ABSTRACT

A temporary locking structure for an end portion of a wire harness is provided. An engaged shaft portion is provided in a bolt inserted into a through hole provided in a vehicle body panel. A plate-shaped engagement flange extends to a connector cover main body attached to an end portion of a wire harness, and has an engagement recessed portion. The engagement recessed portion of the engagement flange is engaged with an engaged shaft portion of the bolt, and thereby the end portion of the wire harness is temporary locked in the vehicle body panel.

2 Claims, 3 Drawing Sheets

TEMPORARY LOCKING STRUCTURE FOR END PORTION OF WIRE HARNESS

CROSS-REFERENCE TO RELATED APPLICATIONS

This application is based on and claims priority under 35 USC 119 from Japanese Patent Application No. 2018-212684 filed on Nov. 13, 2018, the contents of which are incorporated herein by reference.

TECHNICAL FIELD

The present invention relates to a temporary locking structure for an end portion of a wire harness that can be temporarily placed so that the end portion of the wire harness routed in a vehicle does not sag in a state before connector connection.

BACKGROUND ART

When a wire harness is routed in a vehicle, only an end portion of the wire harness may be left in a free state based on a certain degree of support before final connector connection with respect to a mating device is performed. After the next component is assembled in this state, the final connector connection is performed. When a connector attached to the end portion of the wire harness is connected to a connector on a mating device side, flexibility is required for the end portion of the wire harness to perform the connector connection.

For example, FIG. 3 shows a routing structure of a wire harness described in Patent Literature 1.

In the illustrated example, the wire harness is routed in a hybrid automobile (that may be an electric automobile). In FIG. 3, a hybrid automobile 1 is a vehicle that mixes and drives two powers of an engine and a motor unit 2, and electric power from a battery 5 is supplied to the engine and the motor unit 2 via an inverter unit 3. The engine and the motor unit 2, and the inverter unit 3 are mounted in an engine room in a front portion of the vehicle, and the battery 5 is mounted in a rear portion of the vehicle.

The engine and the motor unit 2, and the inverter unit 3 are connected by a high-voltage wire harness 6. The battery 5 and the inverter unit 3 are connected by a first main wire harness 8 disposed in a vehicle floor portion 7 and second wire harnesses 9 connected to both ends of the first wire harness 8. The battery 5 is connected to the second wire harness 9 via a junction block 4.

Here, the first main wire harness 8 has rigidity capable of holding a self-standing shape according to a routing form. In addition, the wire harnesses 9 connected to both ends of the first wire harness 8 have connectors 12, at end portions thereof, respectively connected to connectors on a junction block 4 side and an inverter unit 3 side, and are flexible enough to perform the connector connection.

In a case where the wire harnesses 8 and 9 are routed, only the end portion of the wire harness (here, corresponding to the second wire harness 9) may be left in a free state based on a certain degree of support before the final connector connection is performed with respect to the junction block 4 or the inverter unit 3 that is the mating device. After the next component (such as a suspension or an axle) is assembled in this state, the final connector connection is performed.

CITATION LIST

Patent Literature

Patent Literature 1: JP-A-2012-125097

SUMMARY OF INVENTION

If the end portion of the wire harness (corresponding to the second wire harness 9) having flexibility is not restrained before the connector connection, the end portion of the wire harness is left to sag by its own weight as shown by an arrow A in FIG. 3. In this case, the sagging end portion of the wire harness may interfere with assembling the component such as the suspension or the axle, and the wire harness or the connector may be damaged depending on a working way.

The present invention has been made in view of the above circumstances, and an object thereof is to provide a temporary locking structure, for an end portion of a wire harness, which prevents the end portion of the wire harness from sagging and interfering with attachment of another component.

In order to achieve the above object, a temporary locking structure for an end portion for a wire harness according to the present invention is characterized by the following (1) to (2).

(1) A temporary locking structure for an end portion of a wire harness includes:

a bolt that includes a head portion and a shaft portion having a diameter smaller than that of the head portion, a tip end side of the shaft portion of the bolt being inserted and fixed in a through hole provided in a vehicle body panel in a state where the head portion is positioned outside the vehicle body panel and a predetermined insertion gap is ensured between the head portion and the vehicle body panel;

a connector cover main body that is attached to the end portion of the wire harness; and an elastically deformable engagement flange that extends to the connector cover main body and has a thickness capable of being inserted into the predetermined insertion gap.

An engaged shaft portion is provided at a based end portion of the shaft portion of the bolt, has a diameter smaller than that of the head portion, and is positioned in the insertion gap.

The engagement flange is provided with an engagement recessed portion that has an inlet for engagement on a peripheral edge and can be engaged with the engaged shaft portion of the bolt, and a size of the engagement recessed portion is set to a size that receives a cross-sectional portion exceeding half a circular cross section of the engaged shaft portion of the bolt, and a width of the inlet of the engagement recessed portion is set smaller than a diameter of the engaged shaft portion of the bolt.

(2) In the temporary locking structure for the end portion of the wire harness according to (1), a shape of the engagement recessed portion is set to a sector shape having a diameter corresponding to the diameter of the engaged shaft portion of the bolt and having a central angle exceeding 180°, and thereby a width of the inlet of the engagement recessed portion is set smaller than the diameter of the engaged shaft portion of the bolt.

According to the temporary locking structure for the end portion of the wire harness configured as (1), the engagement recessed portion of the engagement flange is engaged with the engaged shaft portion of the bolt fixed to the vehicle body panel, whereby the end portion of the wire harness can be temporarily locked (temporarily placed) while being prevented from sagging. That is, when a connector is attached to the end portion of the wire harness and connector connection with respect to a mating device is performed, the end portion of the wire harness is generally flexible enough to perform the connector connection. However, in a case of having flexibility, the end portion of the wire harness may sag in an unrestrained state before the end portion of the wire harness is connector-connected to the mating device.

In a case where the end portion of the wire harness sags in the unrestrained state before being connected to the mating device in this manner, interference occurs, so that attachment of a component (such as a suspension or an axle) to a vehicle body may be difficult.

Therefore, the end portion of the wire harness is configured to be capable of being temporarily locked. Thereby, the end portion of the wire harness can be prevented from sagging, and the component can be easily attached without interference of a sagging end portion of the wire harness. In addition, unnecessary damage to the wire harness, the connector cover or the like can be prevented.

When the attachment of the component is completed, the engagement flange is removed from the bolt, and the connector at the end portion of the wire harness can be easily connected to the mating device.

In this case, the size of the engagement recessed portion is set to the size that receives the cross-sectional portion exceeding half the circular cross section of the engaged shaft portion of the bolt, and the width of the inlet of the engagement recessed portion is set smaller than the diameter of the engaged shaft portion of the bolt Therefore, the engagement flange does not fall off the bolt with a small force in a temporarily locked state. In a case of removing (when temporary locking is released), by simply applying a slightly larger force to the connector cover body, the inlet of the engagement recessed portion can be opened using elasticity of the engagement flange, and the engagement flange can be easily removed from the bolt.

In addition, since the bolt after removing the engagement flange blocks the through hole of the vehicle body panel, water and the like can be prevented from entering inside from outside of the vehicle body panel, and the anti-rust effect of the vehicle body panel can be obtained.

According to the temporary locking structure for the end portion of the wire harness configured as (2), since the shape of the engagement recessed portion is set to the sector shape having a central angle exceeding 180°, the engagement flange can be temporarily locked to the bolt without causing a large play and without easily falling off. In addition, the engagement flange can be easily removed.

According to the present invention, the end portion of the wire harness can be temporarily placed so as not to sag, so that interference with the attachment of another component can be prevented. In addition, since the attachment of another component is not interfered with, the wire harness or the connector will not be damaged.

The present invention has been briefly described as above. Details of the present invention will be further clarified by reading a mode for carrying out the present invention described below (hereinafter, referred to as "an embodiment") with reference to the accompanying drawings.

BRIEF DESCRIPTION OF DRAWINGS

FIGS. 2A and 2B are views showing a state when the engagement flange is temporarily locked to the bolt, in which FIG. 2A is a cross-sectional view, and FIG. 2B is a cross-sectional view taken along a line B-B in FIG. 2A.

DESCRIPTION OF EMBODIMENTS

A specific embodiment according to the present invention will be described with reference to drawings.

Figure 1:
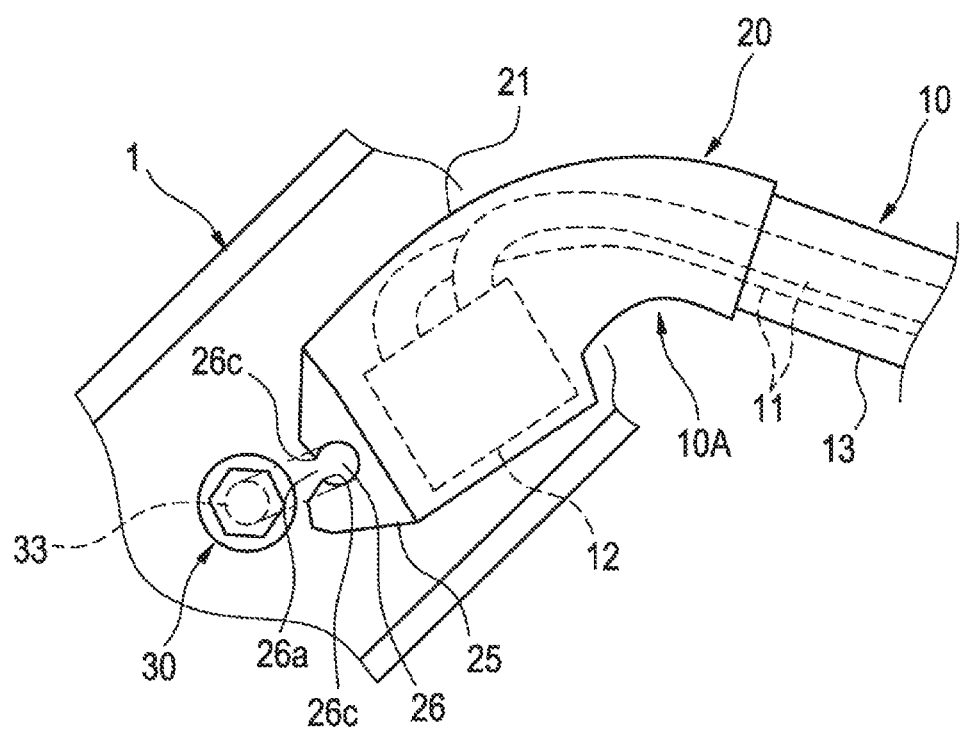
FIG. 1 is an explanatory view of an embodiment of the present invention, and is a perspective view showing a state before an engagement flange of a connector cover attached to an end portion of a wire harness is temporarily locked to a bolt fixed to a through hole of a vehicle body panel.
Figure 2A:
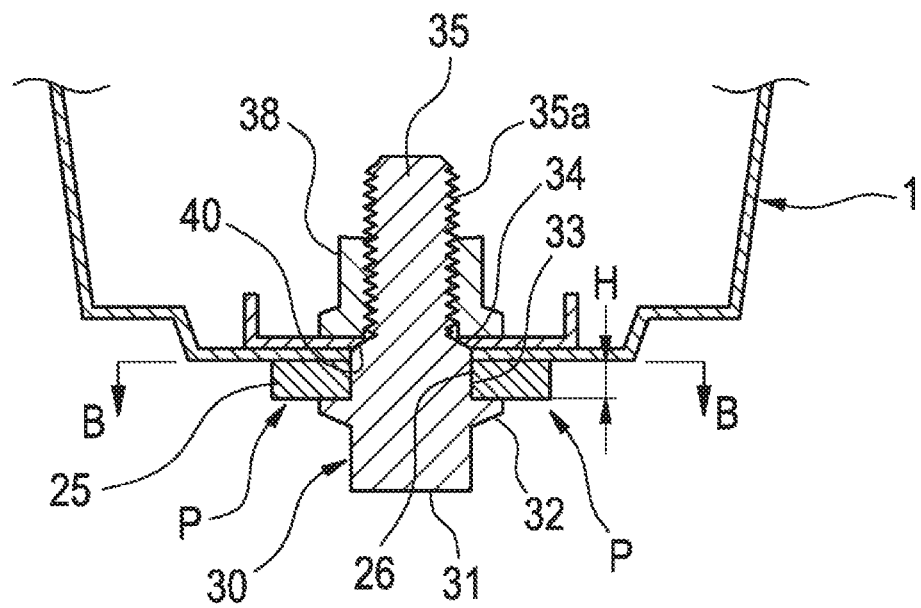
Figure 2B:
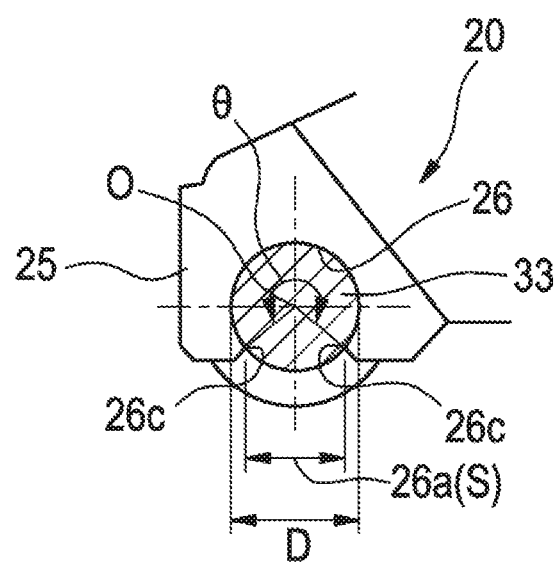
Figure 3:
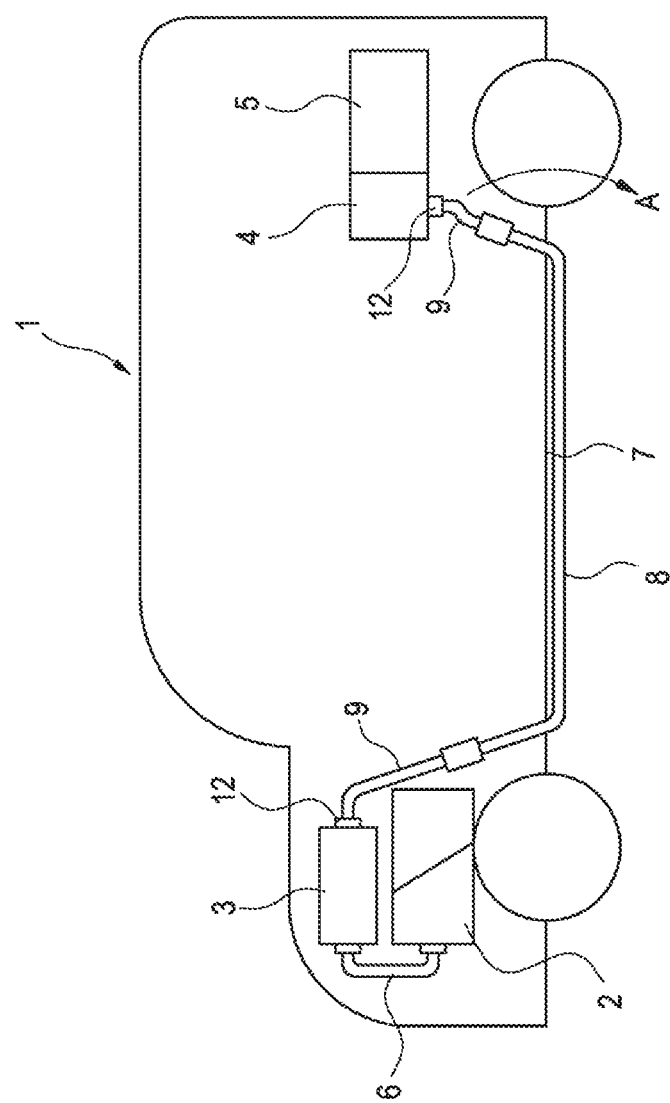
FIG. 3 is a schematic view showing an example of a routing structure of a wire harness in related art.

FIG. 1 is an explanatory view of an embodiment, and is a perspective view showing a state before an engagement flange of a connector cover attached to an end portion of a wire harness is temporarily locked to a bolt fixed to a through hole of a vehicle body panel. FIGS. 2A and 2B are views showing a state when the engagement flange is temporarily locked to the bolt, in which FIG. 2A is a cross-sectional view, and FIG. 2B is a cross-sectional view taken along a line B-B in FIG. 2A.

As shown in FIG. 1, a wire harness 10 includes electric wires 11, a connector 12 attached to end portions of the electric wires 11, and a corrugated tube 13 that surrounds and protects the electric wires 11. A connector cover 20 made of a resin molded body is mounted to an end portion 10A of the wire harness provided with the connector 12. A main body 21 of the connector cover 20 (a connector cover main body) covers the connector 12 and holds an end portion of the corrugated tube 13.

On the other hand, as shown in FIG. 2A, a through hole 40 is provided in a vehicle body panel 1. A bolt 30 is inserted and fixed to the through hole 40. In the bolt 30, in a state where a head portion 31 with a washer 32 having a large diameter is positioned outside the vehicle body panel 1 and a predetermined insertion gap H is ensured between the head portion 31 with the washer 32 and the vehicle body panel 1, a tip end side of a shaft portion 35 with a diameter smaller than that of the head portion 31 with the washer 32 is inserted into the through hole 40. The bolt 30 is fixed to the through hole 40 by screwing a male screw portion 35a on the tip end side of the shaft portion 35 with a nut 38 on an inner side of the vehicle body panel 1. By this fastening, the engaged shaft portion 33, which is provided at a base end portion of the shaft portion 35 of the bolt 30 and has a diameter smaller than that of the head portion 31 with the washer 32, is positioned in the insertion gap H. In a fastened state with respect to the nut 38, a step portion 34 at a boundary between the engaged shaft portion 33 and the shaft portion 35 having a smaller diameter abuts against a peripheral edge of the through hole 40 on an outer side of the vehicle body panel 1, thereby ensuring the insertion gap H.

In the connector cover main body 21 attached to the end portion 10A of the wire harness, a plate-shaped engagement flange 25 made of resin having a thickness capable of being inserted into the insertion gap H ensured at an attachment portion of the bolt 30 is integrally extended. The engagement flange 25 is provided with an engagement recessed portion 26 that has an inlet 26a for engagement on a peripheral edge of the engagement flange 25 and can be engaged with the engaged shaft portion 33 of the bolt 30.

As shown in FIG. 2B, the size of the engagement recessed portion 26 is set to a size that receives a cross-sectional portion exceeding half of a circular cross section of the engaged shaft portion 33 of the bolt 30. Specifically, the shape of the engagement recessed portion 26 is set to a sector shape having a diameter corresponding to the diameter of the engaged shaft portion 33 of the bolt 30 and having a central angle exceeding 180°. That is, when the center of the engaged shaft portion 33 and the engagement recessed portion 26 is O, the sector shape is set to have a central angle θ exceeding 180°, for example, about 240°. Thereby, a width S of the inlet 26a of the engagement recessed portion 26 (the dimension between protruding portions 26c and 26c on both sides of the inlet 26a) is set smaller than a diameter D of the engaged shaft portion 33 of the bolt 30.

In such a configuration, when the engagement flange 25 is inserted into the insertion gap H ensured between the head portion 31 with the washer 32 of the bolt 30 and the vehicle body panel 1, the engagement recessed portion 26 of the engagement flange 25 is engaged with the engaged shaft portion 33 of the bolt 30 from the inlet 26a, whereby the end portion 10A of the wire harness is temporarily locked to the bolt 30 of the vehicle body panel 1.

According to a temporary locking structure for the end portion 10A of the wire harness configured as described above, the engagement recessed portion 26 of the engagement flange 25 is engaged with the engaged shaft portion 33 of the bolt 30 fixed to the vehicle body panel 1, whereby the end portion 10A of the wire harness can be temporarily locked (temporarily placed) in a state while being prevented from sagging.

That is, when the connector 12 is attached to the end portion 10A of the wire harness and connector connection with respect to a mating device is performed, the end portion 10A of the wire harness is generally flexible enough to perform the connector connection. However, in a case of having flexibility, the end portion 10A of the wire harness may sag in an unrestrained state before the end portion 10A of the wire harness is connector-connected to the mating device. In a case where the end portion 10A of the wire harness sags due to the flexibility thereof in the unrestrained state before being connected to the mating device in this manner, interference occurs, so that attachment of a component (such as a suspension or an axle) to a vehicle body may be difficult.

Therefore, the end portion 10A of the wire harness is temporarily locked. Thereby, the end portion 10A of the wire harness can be prevented from sagging, and the component can be easily attached without interference of a sagging end portion 10A of the wire harness. In addition, unnecessary damage to the wire harness 10, the connector cover 20 or the like can be prevented.

When the attachment of the component is completed, the engagement flange 25 is removed from the bolt 30, and the connector 12 at the end portion 10A of the wire harness can be easily connected to the mating device.

In this case, the size of the engagement recessed portion 26 is set to the size that receives the cross-sectional portion exceeding half of the circular cross section of the engaged shaft portion 33 of the bolt 30, and the width S of the inlet 26a of the engagement recessed portion 26 is set smaller than the diameter D of the engaged shaft portion 33 of the bolt 30. Therefore, the engagement flange 25 does not fall off the bolt 30 with a small force in a temporarily locked state. In a case of removing (when temporary locking is released), by simply applying a slightly larger force to the connector cover body 21, the inlet 26a of the engagement recessed portion 26 can be opened using elasticity of the engagement flange 25, and the engagement flange 25 can be easily removed from the bolt 30.

As shown in FIG. 2A, since the bolt 30 after removing the engagement flange 25 blocks the through hole 40 of the vehicle body panel 1, water and the like P can be prevented from entering inside from outside of the vehicle body panel 1, and the anti-rust effect of the vehicle body panel 1 can be obtained.

In addition, since the shape of the engagement recessed portion 26 is set to the sector shape having a central angle θ exceeding 180°, the engagement flange 25 can be temporarily locked to the bolt 30 without causing a large play and without easily falling off. In addition, the engagement flange 25 can be easily removed.

Here, features of the temporary locking structure for the end portion of the wire harness according to the embodiment of the present invention described above will be briefly summarized in the following [1] to [2].

[1] A temporary locking structure for an end portion (10A) of a wire harness includes:

a bolt (30) that includes a head portion (31) and a shaft portion (35) having a diameter smaller than that of the head portion (31), a tip end side of the shaft portion (35) of the bolt (30) being inserted and fixed in a through hole (40) provided in a vehicle body panel (1) in a state where the head portion (31) is positioned outside the vehicle body panel (1) and a predetermined insertion gap (H) is ensured between the head portion (31) and the vehicle body panel (1);

a connector cover main body (21) that is attached to an end portion (10A) of a wire harness; and an elastically deformable engagement flange (25) that extends to the connector cover main body (21) and has a thickness capable of being inserted into the insertion gap (H).

An engaged shaft portion (33) is provided at a based end portion of the shaft portion (35) of the bolt (30), has a diameter smaller than that of the head portion (31), and is positioned in the predetermined insertion gap (H).

The engagement flange (25) is provided with an engagement recessed portion (26) that has an inlet (26a) for engagement on a peripheral edge and can be engaged with the engaged shaft portion (33) of the bolt (30).

A size of the engagement recessed portion (26) is set to a size that receives a cross-sectional portion exceeding half a circular cross section of the engaged shaft portion (33) of the bolt (30), and a width (S) of the inlet (26a) of the engagement recessed portion (26) is set smaller than a diameter (D) of the engaged shaft portion (33) of the bolt (30).

[2] In the temporary locking structure for the end portion (10A) of the wire harness according to [1], a shape of the engagement recessed portion (26) is set to a sector shape having a diameter corresponding to the diameter (D) of the engaged shaft portion (33) of the bolt (30) and having a central angle (θ) exceeding 180°, thereby a width (S) of the inlet (26a) of the engagement recessed portion (26) is set smaller than the diameter (D) of the engaged shaft portion (33) of the bolt (30).

What is claimed is:

1. A temporary locking structure for an end portion of a wire harness comprising:
    a bolt that includes a head portion and a shaft portion having a diameter smaller than that of the head portion, a tip end side of the shaft portion of the bolt being inserted and fixed in a through hole provided in a vehicle body panel in a state where the head portion is positioned outside the vehicle body panel and a predetermined insertion gap is ensured between the head portion and the vehicle body panel;

a connector cover main body that is attached to an end portion of a wire harness; and an elastically deformable engagement flange that extends to the connector cover main body and has a thickness capable of being inserted into the predetermined insertion gap, wherein an engaged shaft portion is provided at a based end portion of the shaft portion of the bolt, has a diameter smaller than that of the head portion, and is positioned in the predetermined insertion gap, the engagement flange is provided with an engagement recessed portion that has an inlet for engagement on a peripheral edge and can be engaged with the engaged shaft portion of the bolt, and a size of the engagement recessed portion is set to a size that receives a cross-sectional portion exceeding half a circular cross section of the engaged shaft portion of the bolt, and a width of the inlet of the engagement recessed portion is set smaller than a diameter of the engaged shaft portion of the bolt.

2. The temporary locking structure for the end portion of the wire harness according to claim 1, wherein a shape of the engagement recessed portion is set to a sector shape having a diameter corresponding to the diameter of the engaged shaft portion of the bolt and having a central angle exceeding 180°, and a width of the inlet of the engagement recessed portion is set smaller than the diameter of the engaged shaft portion of the bolt.

* * * * *